(No Model.)
C. H. FRENCH & A. T. GIFFORD.
DRILLING MACHINE.
No. 317,635. Patented May 12, 1885.
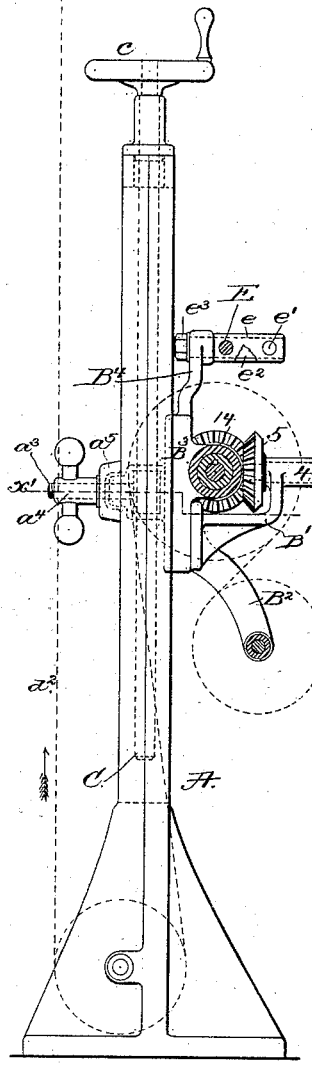
Fig. 2.
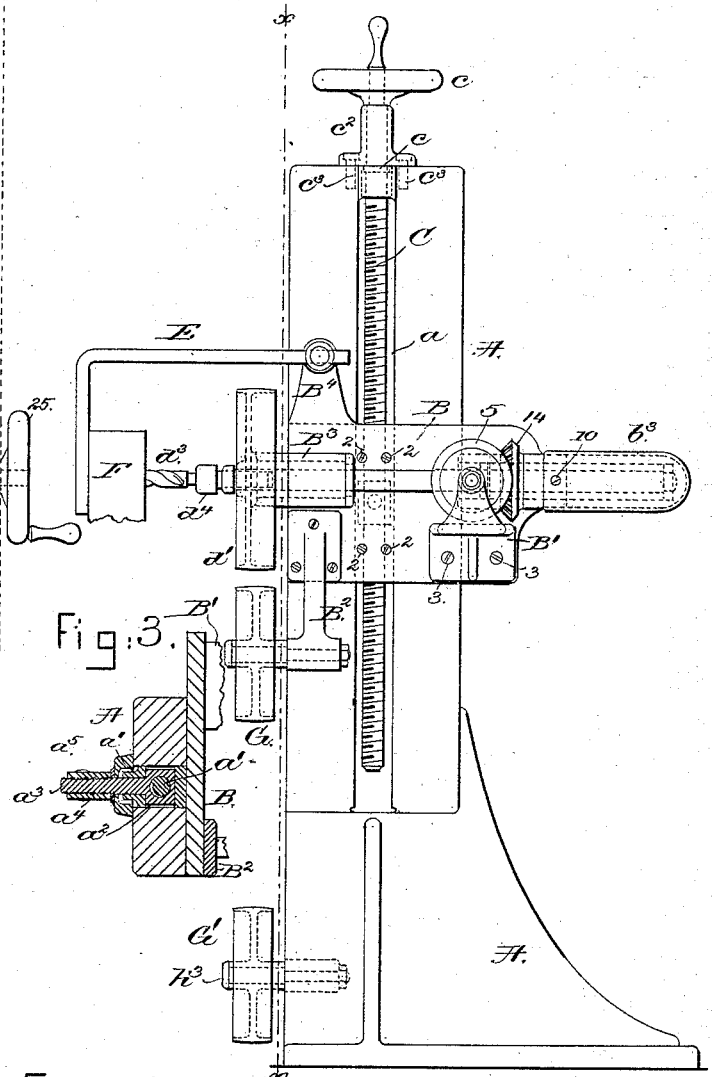
Fig. 1.
Fig. 3.
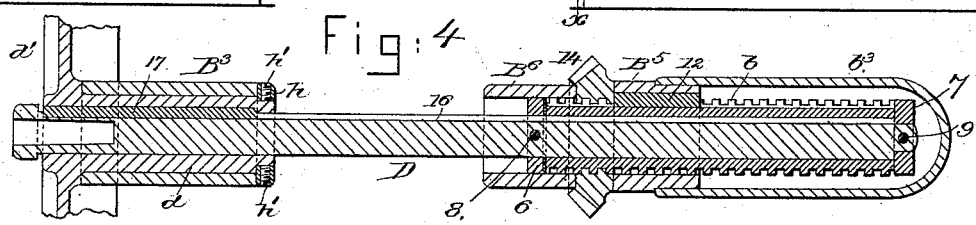
Fig. 4.
Witnesses.
John F. Nelson
John F. C. VanKirk
Inventors.
C. Hermon French and
Atenza T. Gifford
by Crosby & Gregory attys

United States Patent Office.

C. HERMON FRENCH AND ALENZA T. GIFFORD, OF HOPEDALE, MASSACHUSETTS, ASSIGNORS TO THE DUTCHER TEMPLE COMPANY, OF SAME PLACE.

DRILLING-MACHINE.

SPECIFICATION forming part of Letters Patent No. 317,635, dated May 12, 1885.

Application filed February 9, 1885. (No model.)

*To all whom it may concern:*

Be it known that we, C. HERMON FRENCH and ALENZA T. GIFFORD, of Hopedale, county of Worcester, and State of Massachusetts, have invented an Improvement in Adjustable Drills, of which the following description, in connection with the accompanying drawings, is a specification, like letters on the drawings representing like parts.

This invention has for its object the production of a drill by which holes may be quickly drilled in machine frame-work or in other castings which cannot be conveniently lifted upon a table or bed of a drill, or be moved readily over such table. In our invention a carriage carrying a drill-actuating spindle is mounted and made vertically movable upon a frame-work so as to place the drill at the proper distance from the floor on which the article to be drilled stands, the carriage and frame-work being provided with three pulleys, over which passes a belt extended about a pulley on a counter-shaft, so that the drill-actuating spindle may be driven in all positions of the bracket. The drill-frame is provided with an adjustable abutment to bear against the rear side of the work to be drilled.

Our invention consists, essentially, in the combination, with a carriage having a drill-actuating spindle provided with a pulley and a second pulley mounted on the said carriage, of a pulley mounted on the frame-work, the actuating-belt for the spindle and drill being extended about the three pulleys above referred to and driving the spindle in all positions of the carriage, substantially as will be described.

Other features of our invention will be hereinafter referred to, and specially pointed out in the claims.

Figure 1 in side elevation represents a drill embodying our invention, the hand-wheel to actuate the drill-feeding mechanism being omitted. Fig. 2 is a section of Fig. 1 in the dotted line $x\,x$, looking toward the right, the dotted lines showing the position of the pulleys and belt to rotate the spindle. Fig. 3 is a sectional detail in the line $x'$, Fig. 2; and Fig. 4 is a longitudinal section taken through the spindle and its attached parts.

The frame A, having a suitable foot to be bolted to the floor, is provided with a long vertical slot, $a$, to receive a cross-head, $a'$, attached by screws 2 2 to the rear side of the plate B, the latter and the cross-head constituting a carriage. The cross-head in a slot therein receives a nut, $a^2$, having a threaded shank, $a^3$, extended out through the slot $a$ at the rear side of the frame A, where the said shank has applied to it a concave washer, $a^5$, and a nut, $a^4$, the latter acting against the said washer interposed between the nut $a^4$ and the frame-work A. When the nut $a^4$ is turned upon the shank $a^3$ of the nut, the carriage B is locked in place.

The nut $a^2$, located in the cross-head $a'$, receives the screw C, provided at its upper end with a hand-wheel, $c$, the said screw having a shoulder, $c'$, (shown in dotted lines, Fig. 1,) that, in connection with the tubular cap $c^2$, attached to the upright A by the screws $c^3$, (shown by dotted lines, Fig. 1,) enables the screw to be rotated to effect the ascent or descent of the carriage when the nut $a^4$ is loosened; but during such rotation the shoulder $c'$ prevents longitudinal movement of the screw.

The carriage B has attached brackets B' B², bearings B³ B⁵ B⁶, and an ear, B⁴.

The bracket B', attached to the carriage by screws 3 3, has a bearing, 4, which receives a shaft provided at one end with a hand-wheel, 25, and at its other end with a bevel-gear, 5, that engages a bevel-gear, 14, screw-threaded internally and surrounding and engaging a screw-threaded sleeve, $b$, placed loosely on the drill-actuating spindle D, between two collars, 6 7, attached to the said spindle D by rivets 8 9. The bevel-gear 14 is mounted loosely between the sleeve-bearings B⁵ and B⁶, the former having a cap, $b^3$, secured to it by screw 10.

The threaded sleeve $b$ is grooved longitudinally to receive the spline 12, which, placed in the said groove, prevents rotation of the threaded sleeve by the bevel-gear 14, which runs loosely thereon between the bearings B⁵ B⁶, to effect the longitudinal movement of the said sleeve as the hand-wheel 25 is turned, thus feeding the spindle D and drill $d^3$ forward by hand.

The spindle D is grooved longitudinally at 16 to receive a key, 17, inserted therein, and also in a groove of the hub $d$ of the pulley $d'$, the rotation of said pulley by the belt $d^2$ effecting the rotation of the spindle D and drill $d^3$, held by a chuck, $d^4$, of usual construction, inserted in the open end of the spindle D. The hub $d$ is extended through the bearing $B^3$, in which it turns, and beyond the bearing the end of the hub has a collar, $h$, attached to it by screws $h'$. (See Fig. 4.)

The ear $B^4$ at its upper end receives a bolt, $e^2$, screw-threaded at one end to receive a nut, $e^3$, and provided with two cross-holes, $e'$. This bolt receives upon it a loose sleeve, $e$, also provided with two cross-holes to register with those in the bolt $e^2$.

When the cross-holes in the loose sleeve and in the bolt are in line, if the shank of the abutment E be inserted therein and the nut $e^3$ be turned on the bolt, the latter will be moved longitudinally in the sleeve $e$, thus binding the shank of the abutment in place. The work F or thing to be bored or drilled (see Fig. 1) is supported at its rear side by the abutment E.

The bracket $B^2$ has a stud, on which is mounted a belt-pulley, G, and a stud, $h^3$, on the frame-work has mounted on it a third pulley, G'.

The driving-belt $d^2$ (shown in dotted lines and supposed to be driven from a counter-shaft) is extended about the pulleys $d'$ G G', and rotates the drill-actuating spindle-pulley $d'$, no matter what is the position of the carriage on the frame-work A.

The hand-wheel 25 (shown only in Fig. 2) enables the feed of the drill to be accomplished by hand, and by the screw C the carriage may be quickly raised or lowered to place the drill in the proper plane.

We claim—

1. The frame-work, the carriage, the drill-actuating spindle, its pulley $d'$, and the pulley G, made vertically movable with the said carriage, combined with a third pulley, G', over which and the pulleys $d'$ G the driving-belt is extended, whereby the drill-actuating spindle may be kept in rotation in all positions of the carriage in the frame-work, substantially as described.

2. The frame-work, its screw C, the carriage, the drill-actuating spindle, its driving-pulley, the pulley G, made movable with the said carriage, and the adjustable abutment combined with the pulley G', mounted on a stud of the frame-work, substantially as described.

3. The frame-work, the carriage, the screw to adjust it vertically, and the drill-actuating spindle, and means, substantially as described, to feed the same longitudinally in its bearings, combined with the adjustable abutment, substantially as set forth.

4. The carriage, its bearings $B^3$ $B^5$ $B^6$, the drill-actuating spindle, its collars, and the grooved screw-threaded sleeve $b$, combined with the bevel-gear screw-threaded at its interior and with the spline 12, to operate substantially as described.

5. The carriage, its bearings $B^3$ $B^5$ $B^6$, the drill-actuating spindle provided with groove 16, the collars 6 7, the pulley $d'$, and spline 17, combined with the longitudinally screw-threaded sleeve $b$, spline 12, bevel-gear 14, threaded at its interior, and with means, substantially as described, to rotate the said gear 14, as set forth.

6. The abutment, the carriage, the ear $B^4$, and adjustable bolt provided with cross-holes, combined with the loose sleeve provided with cross-holes, to operate substantially as described.

In testimony whereof we have signed our names to this specification in the presence of two subscribing witnesses.

C. HERMON FRENCH.
ALENZA T. GIFFORD.

Witnesses:
R. A. COOKE,
F. J. DUTCHER.